United States Patent [19]

Menhennett et al.

[11] Patent Number: 5,700,406

[45] Date of Patent: Dec. 23, 1997

[54] PROCESS OF AND APPARATUS FOR MAKING A THREE-DIMENSIONAL ARTICLE

[75] Inventors: Herbert E. Menhennett; William Berdell Barlage, III, both of Easley; Michael T. Nowak, Simpsonville, all of S.C.

[73] Assignee: BPM Technology, Inc., Greenville, S.C.

[21] Appl. No.: 639,223

[22] Filed: Apr. 26, 1996

[51] Int. Cl.[6] .............. B29C 33/38; B29C 41/02; B29C 41/52

[52] U.S. Cl. .............. 264/40.4; 264/219; 264/297.1; 264/308; 264/317; 264/328.1; 425/135; 425/140; 425/175; 425/176; 425/375; 425/542

[58] Field of Search .............. 264/40.4, 219, 264/297.1, 308, 317, 328.1; 425/135, 140, 175, 176, 375, 542

[56] References Cited

U.S. PATENT DOCUMENTS

| | | | |
|---|---|---|---|
| 4,575,330 | 3/1986 | Hull | 425/174.4 |
| 4,665,492 | 5/1987 | Masters | 364/468.26 |
| 4,749,347 | 6/1988 | Valavaara | 425/135 |
| 5,031,120 | 7/1991 | Pomerantz et al. | 364/468.27 |
| 5,038,014 | 8/1991 | Pratt et al. | 219/121.64 |
| 5,059,266 | 10/1991 | Yamane et al. | 156/64 |
| 5,121,329 | 6/1992 | Crump | 364/468.26 |
| 5,126,529 | 6/1992 | Weiss et al. | 219/121.6 |
| 5,128,235 | 7/1992 | Vassiliou et al. | 430/322 |
| 5,134,569 | 7/1992 | Masters | 364/474.24 |
| 5,136,515 | 8/1992 | Helinski | 364/468.26 |
| 5,140,937 | 8/1992 | Yamane et al. | 118/695 |
| 5,141,680 | 8/1992 | Almquist et al. | 264/401 |
| 5,149,548 | 9/1992 | Yamane et al. | 425/174.4 |
| 5,204,124 | 4/1993 | Secretan et al. | 425/145 |
| 5,207,371 | 5/1993 | Prinz et al. | 228/125 |
| 5,216,616 | 6/1993 | Masters | 364/474.24 |
| 5,257,657 | 11/1993 | Gore | 164/46 |
| 5,260,009 | 11/1993 | Penn | 264/40.1 |
| 5,287,435 | 2/1994 | Cohen et al. | 395/118 |
| 5,301,415 | 4/1994 | Prinz et al. | 29/458 |
| 5,301,863 | 4/1994 | Prinz et al. | 228/33 |
| 5,303,141 | 4/1994 | Batchelder et al. | 364/149 |
| 5,340,433 | 8/1994 | Crump | 156/578 |
| 5,439,622 | 8/1995 | Pennisi et al. | 264/219 X |
| 5,506,607 | 4/1996 | Sanders, Jr. et al. | 347/1 |

FOREIGN PATENT DOCUMENTS

| | | |
|---|---|---|
| 0 420 614 | 4/1991 | European Pat. Off. . |
| 0 606 627 | 7/1994 | European Pat. Off. . |
| 92/08200 | 5/1992 | WIPO . |
| 92/18323 | 10/1992 | WIPO . |
| 95/05943 | 3/1995 | WIPO . |

Primary Examiner—Leo B. Tentoni
Attorney, Agent, or Firm—Allen, Dyer, Doppelt, Milbrath & Gilchrist, P.A.

[57] ABSTRACT

An apparatus for making a three-dimensional article based upon article defining data may be used to make a mold for the article and molding the article from the mold. Alternately, the apparatus may be used to make articles having filled or solid portions. The apparatus preferably includes a base, a processor for defining a mold skin for producing a mold for the three-dimensional article, and a build material dispenser for dispensing build material responsive to the processor to construct the mold skin extending outwardly from the base and defining at least one cavity. Solidifiable fill material is introduced into the cavity to form solid mold portions. The solid mold portions may be separated from the mold skin, and injection molding, for example, used to mold the three-dimensional article. The base preferably includes a thin plastic layer which is penetrable to permit introduction of the solidifiable fill material into the cavity.

70 Claims, 8 Drawing Sheets

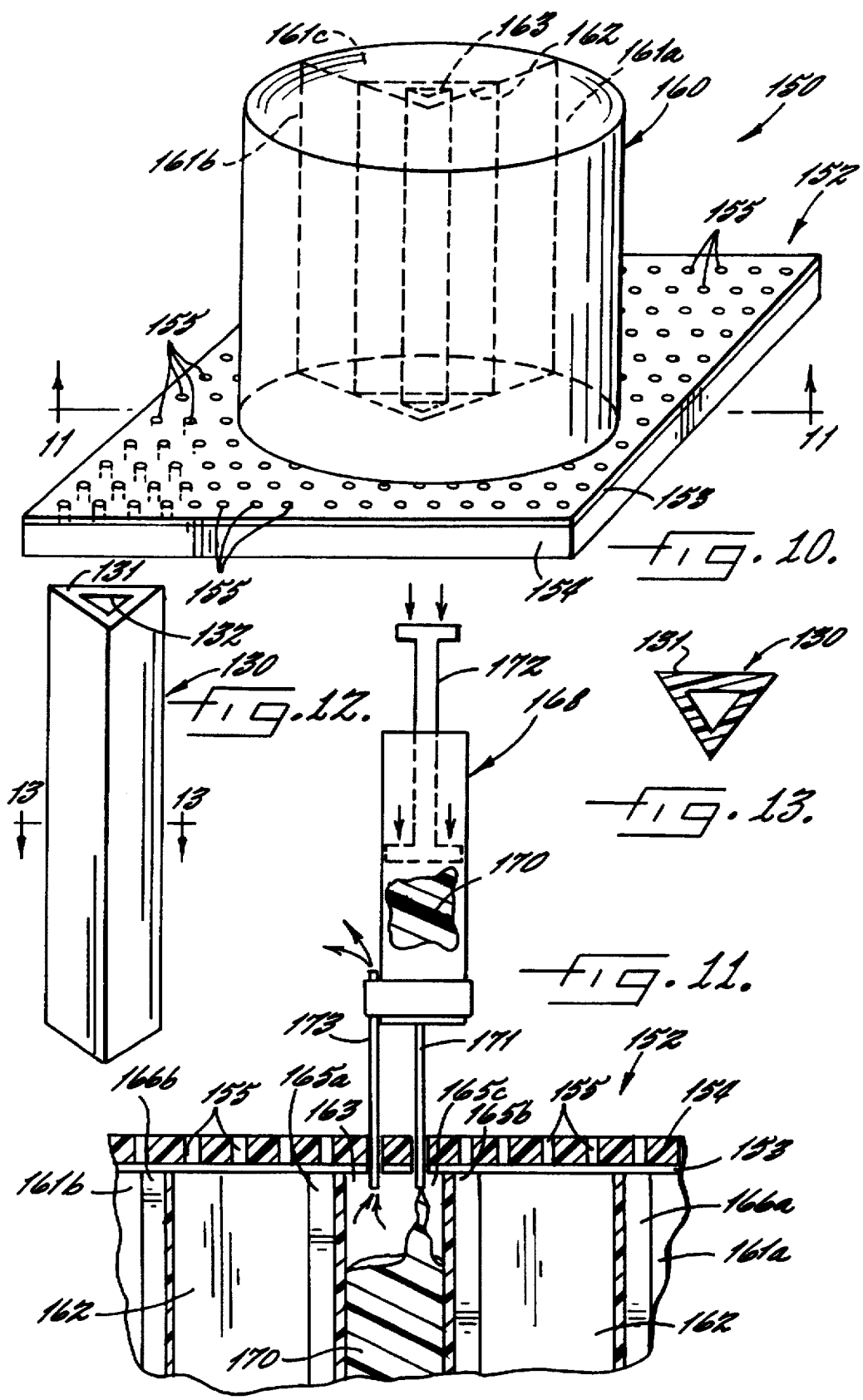

PROCESS OF AND APPARATUS FOR MAKING A THREE-DIMENSIONAL ARTICLE

FIELD OF THE INVENTION

The invention relates to an apparatus and related methods for making articles, and more particularly, to an apparatus and methods for making molds and molded articles.

BACKGROUND OF THE INVENTION

In the design and manufacture of a three-dimensional article, it is common practice to first create an initial design and then manually produce a custom prototype, or model, of the article based upon the initial design. After reviewing the initial prototype, design revisions are often made requiring the production of yet another prototype. This process of review and redesign may be repeated a number of times before finding the desired design thereby requiring a number of iterative steps to produce a single finished article. Accordingly, the process of designing and prototyping an article may involve considerable time, effort and expense.

Computer aided design (CAD) is commonly used for automating the design process. With the aid of a suitable computer, an operator is able to design a three-dimensional article and display the design on a two-dimensional medium, such as a display screen or paper. A significant advance in the art of three-dimensional design and modeling is disclosed in U.S. Pat. No. 4,665,492 to Masters entitled "Computer Automated Manufacturing Process and System." This patent discloses an apparatus including a positionable ejection head for ballistically emitting small mass particles to construct a three-dimensional article based upon article defining data. In other words, the patent discloses the advantageous combination of CAD with an apparatus for precisely constructing the article based upon the generated CAD data.

Stereolithography is another technology for producing a prototype based upon computer generated coordinate data. An example of stereolithography is disclosed in U.S. Pat. No. 4,575,330 to Hull entitled "Apparatus for Production of Three-Dimensional Objects By Stereolithography." The patent discloses an apparatus producing an article by forming successive cross-sectional laminae of the article at the surface of a fluid medium. The fluid medium is capable of altering its physical state from a fluid to a solid in response to selective stimulation such as by UV radiation; particle bombardment, such as electron beams; chemical reaction; or impinging radiation other than UV radiation. The source of selective stimulation is controlled by a computer in response to computer generated coordinate data.

Another apparatus and method for forming three-dimensional articles from a material which is normally solid but flowable when heated is disclosed, for example, in U.S. Pat. No. 5,141,680 to Almquist et al. entitled "Thermal Stereolithography." The apparatus includes a nozzle for dispensing a stream of material which has been heated to the point that it flows. The material is dispensed through the nozzle by applying pressure, and the flow of material can be stopped by a slidable valve or by controlling the pressure. Precise control of the flow of material may be difficult to obtain. Moreover, unsupported portions of the article may be problematic and may collapse unless support is provided. Accordingly, a second support material is provided that must later be removed from the article.

Along these lines, U.S. Pat. No. 5,136,515 to Helinski entitled "Method and Means for Constructing Three-Dimensional Articles by Particle Deposition." This patent discloses a device including two jetting heads, or alternately a single jetting head with two feeder lines. In both embodiments, the controller causes fabrication particle material to be ejected as droplets forming the three-dimensional object, while a complementary support structure is created by the ejection of support particles. U.S. Pat. No. 5,260,009 to Penn entitled "System, Method, and Process for Making Three-Dimensional Objects" discloses yet another apparatus for forming three-dimensional articles wherein a second or support material is dispensed with each layer of the three-dimensional article as it is formed.

Some articles are desirably more rugged than typically provided by a relatively thin outer skin as may be made by several of the above techniques. In other words, it may be desirable to produce an article having an arbitrary outer shape with solid interior portions, for example. As noted in U.S. Pat. No. 5,136,515 to Helinski, the article produced by three-dimensional modelling may itself be a mold that may be used in another device and subsequent operation to ultimately produce a desired article. Unfortunately, depositing both support and build materials via the disclosed jets may take an undesirably long time since essentially an entire block of both support and build material must be formed particle-by-particle.

U.S. Pat. No. 5,204,055 to Sachs et al. also discloses an apparatus for making a mold, for example, by depositing a layer of porous material or powder in a confined region and then depositing a binder to selected regions to produce a layer having bonded portions. Successive layers are so formed and the unbonded or loose power is removed. For making a mold, the loose unbound powder may be washed out of the mold through the same passageways that will later admit molten metal. The mold once formed, must be transferred to another apparatus for the molding process. Accordingly, the overall process may be relatively slow and difficult to monitor and control.

SUMMARY OF THE INVENTION

In view of the foregoing background, it is therefore an object of the invention to provide an apparatus and associated method to allow a designer to quickly and relatively inexpensively make an arbitrary three-dimensional article with high accuracy, and particularly having one or more solid portions.

It is another object of the invention to provide an apparatus and associated method to allow fabrication of a mold or molded article with high accuracy.

These and other objects, features, and advantages in accordance with the present invention are provided by one embodiment of the invention which is directed to an apparatus for making a mold for a three-dimensional article, and molding the article based upon the mold. More particularly, the apparatus preferably includes a base, processor means for defining a mold skin for producing a mold for the three-dimensional article, and build material dispensing means for dispensing build material responsive to the processor means to construct the mold skin extending outwardly from the base and defining at least one cavity. Filling means is preferably provided for introducing solidifiable fill material into the at least one cavity to form solid mold portions. In addition, separating means is preferably provided for separating the solid mold portions from the mold skin, and molding means uses the solid mold portions to mold or form the three-dimensional article.

The build material dispensing means is preferably provided by a build material jet and jet positioning means for advancing the build material jet along a predetermined path of travel relative to the base allowing five degrees of motion relative to the base. The separating means preferably comprises build material dissolving means for dissolving build material defining the mold skin. In addition, the molding means may preferably comprise an injection molder.

The base preferably includes penetrable surface defining means for being penetrated to allow introduction of solidifiable fill material into the at least one cavity. The penetrable surface defining means preferably comprises a layer of material having properties for adhering dispensed build material thereto. The base is preferably provided by a generally planar member having a plurality of openings extending therethrough, and the penetrable surface defining means is preferably provided by a relatively thin plastic layer adhesively secured to the planar member. In addition, the plurality of openings of the planar member are desirably arranged in a predetermined pattern to facilitate introduction of solidifiable fill material through a first opening and into the cavity, and to allow air to escape from the cavity through a second opening during filling. Accordingly, the filling means may include a needle or tube for penetrating a second area of the plastic layer for permitting escape of air from the cavity during filling thereof.

Another aspect of the invention is that the base and its penetrable surface defining means may advantageously be used to form solid articles or form articles having solid portions, for example. In other words, the solid portions may be produced by separating the skin from the solid portions. Alternately, the skin may be left covering the solid portions to produce a more rugged three-dimensional article. In a variation of this embodiment of the invention, the filling of the at least one cavity may be accomplished by manual injection or introduction of solidifiable or other fill materials. Accordingly, the base, including its planar member and plastic layer, may be transparent to facilitate viewing of the level during filling.

A method aspect of the present invention is for making a three-dimensional article based upon article defining data. The method preferably comprises the steps of: providing a base having a penetrable surface; dispensing build material based upon the article defining data to construct wall portions extending outwardly from the base and defining at least one cavity; and penetrating the penetrable surface of the base and introducing fill material therethrough and into the at least one cavity. The article produced may be mold portions or the desired articles themselves. If the mold portions are produced, the method desirably also includes the steps of separating the mold portions, and molding one or more of the articles using the mold.

BRIEF DESCRIPTION OF THE DRAWINGS

FIG. 10 is a perspective view of a mold skin positioned upon a base in accordance with the present invention.

FIG. 11 is an enlarged cross-sectional view taken along lines 11—11 of FIG. 10 and illustrating filling a cavity defined by a portion of the mold skin.

FIG. 12 is a perspective view of the article being molded as shown in FIGS. 10 and 11.

FIG. 13 is a cross-sectional view of the article Of FIG. 12 taken along lines 13—13.

DETAILED DESCRIPTION OF THE PREFERRED EMBODIMENTS

Figure 1:
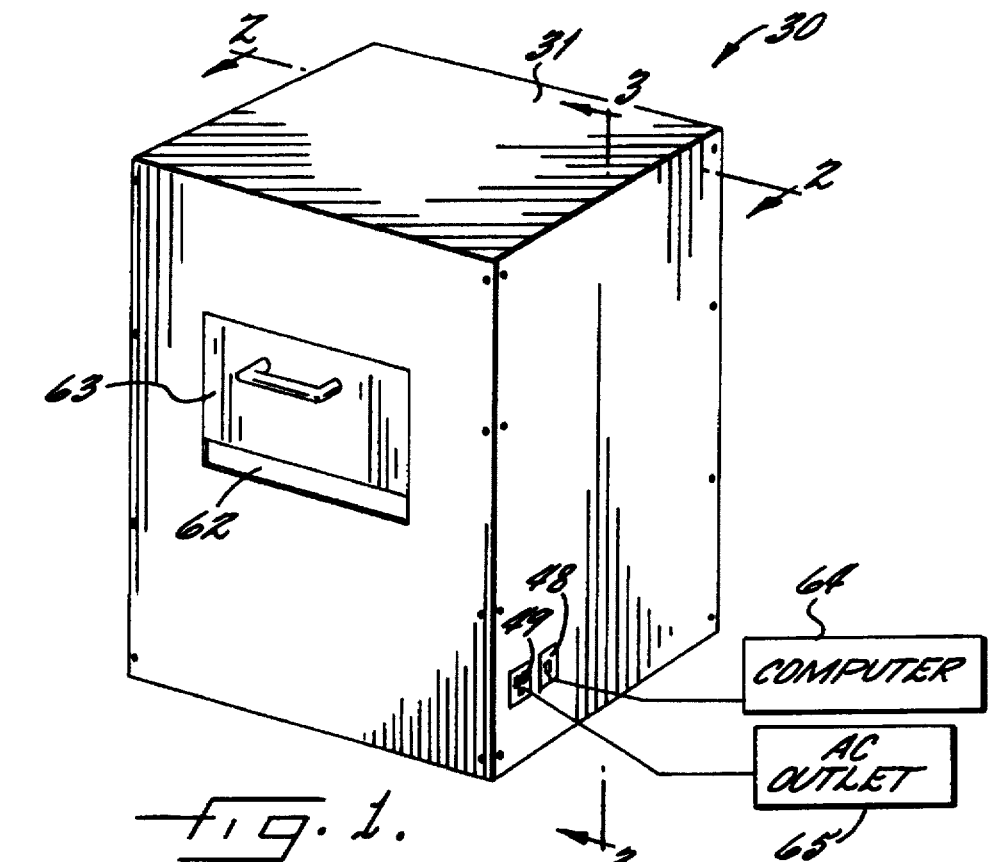
FIG. 1 is a perspective view of the apparatus for forming three-dimensional articles according to the invention.
Figure 4:
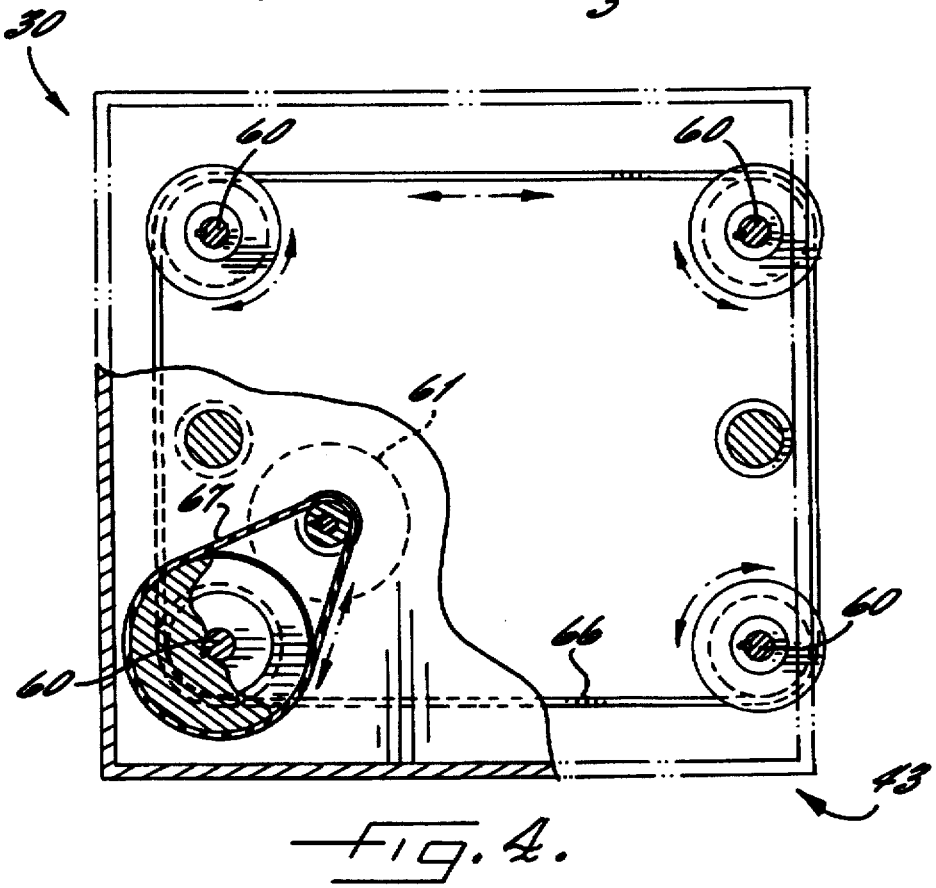
FIG. 4 is a sectional view of the apparatus taken along lines 4—4 of FIG. 2.
Figure 2:
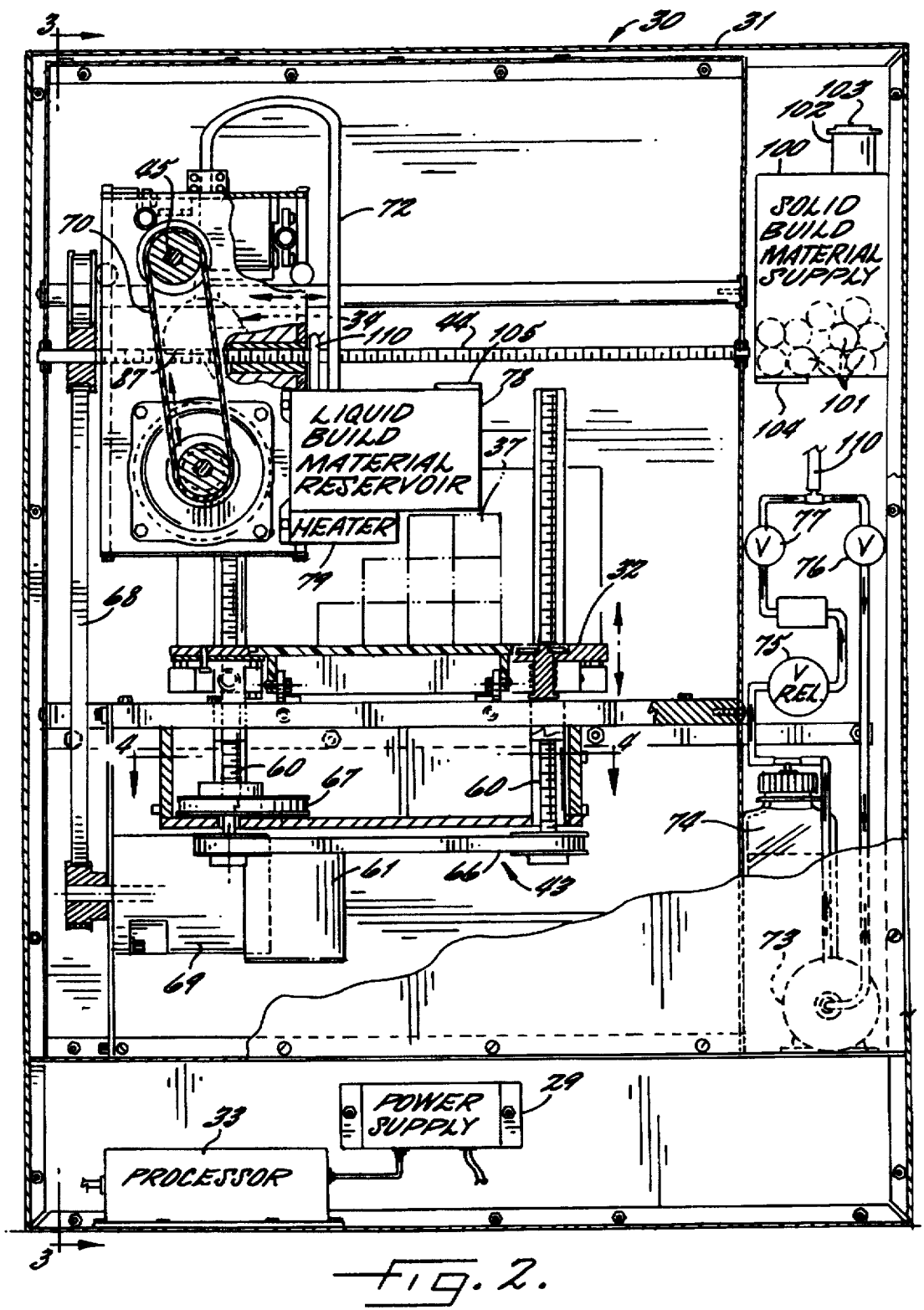
FIG. 2 is a sectional view of the apparatus taken along lines 2—2 of FIG. 1.
Figure 3:
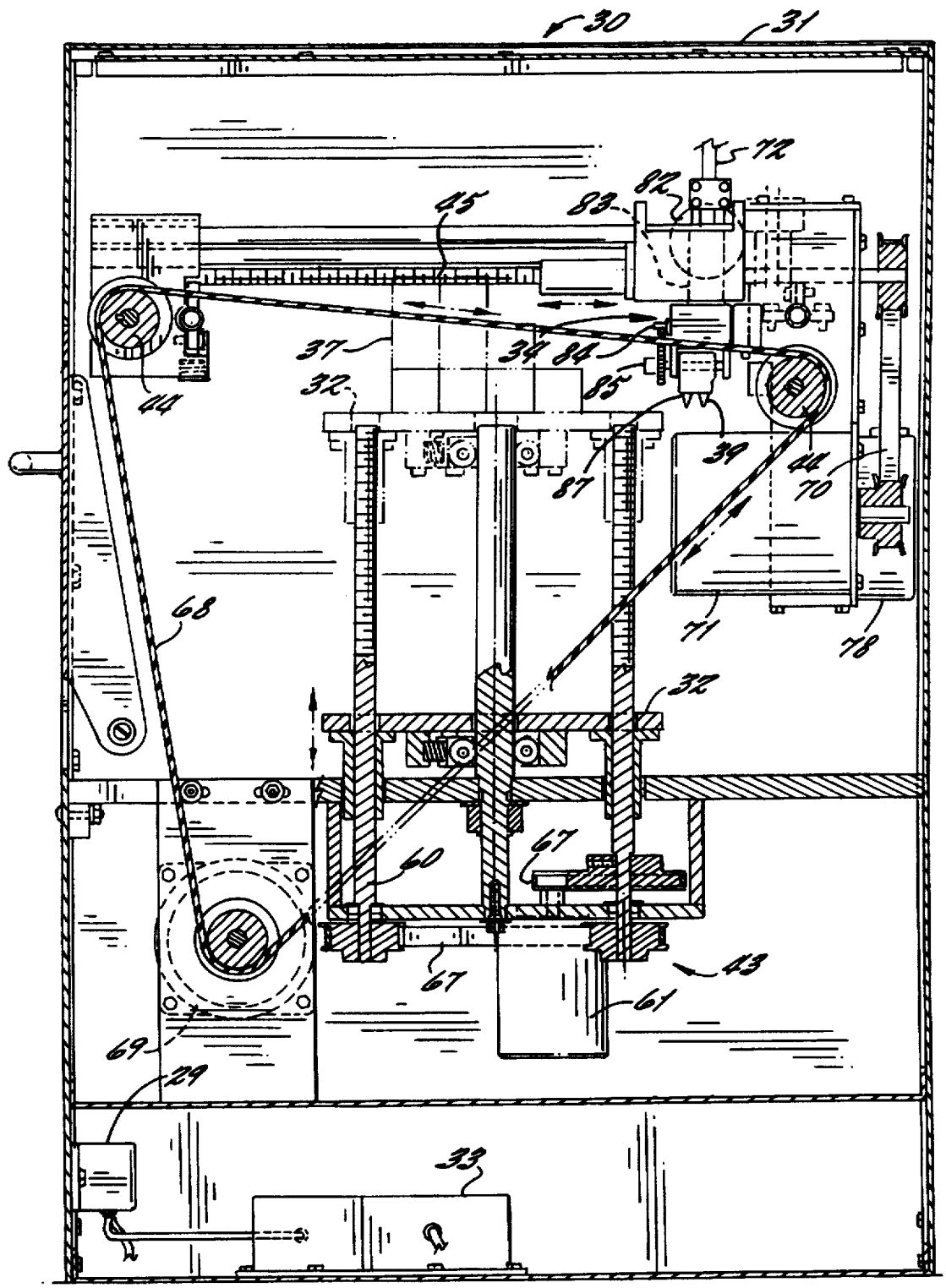
FIG. 3 is a sectional view of the apparatus taken along lines 3—3 of FIG. 2.

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout and prime notation is used to indicate similar elements in alternate embodiments.

Referring initially to FIGS. 1–5, the three-dimensional article manufacturing apparatus 30 according to the invention is now described. The apparatus 30 includes a generally rectangular frame or housing 31 having an access opening 62 closed by a sliding door 63. A power port 49 facilitates electrical connection to an external power source, such as from an AC outlet 65. A computer port 48 allows connection to an external computer 64. An external computer 64, such as a work station or personal computer, may be used to generate a digital data file containing the three-dimensional coordinate data defining an article or model to be built. For example, the data may be from an STL file which defines the article in triangular facets, as would be readily understood by those skilled in the art.

In addition, it will be understood by those having skill in the art that the data file may be transferred to the apparatus by a transferable memory medium such as a magnetic disk or tape, or a microelectronic memory, not shown. Accordingly, the apparatus 30 may be adapted to receive coordinate data from any number of sources having the appropriate electronic data format. If data is transferred by a transferable memory medium, for example, the apparatus 30 may include a disk drive, a tape reader, or other means for reading electronic data from a transferrable memory medium. The apparatus 30 includes a processor 33 which receives the digital data file and translates the coordinate data therein to control signals, as described further herein. The apparatus 30 also includes a power supply 29.

The apparatus 30 includes a platform 32 on which the article 37 is built, and a ballistic jetting head 34 from which droplets of liquid build material are jetted. More particularly, the jetting head 34 may include a piezoelectric jet 39 carried by jetting head 34 for dispensing build material in a plurality of droplets toward the platform 32 to construct the article 37. The build material is normally solid when at the temperature of the interior of the apparatus, but is heated to a liquid for delivery to the jetting head as described in greater detail below. In other words, the heated liquid droplets of build material are jetted from the jetting head 34 to an intended landing position on either the platform 32 or a portion of previously jetted build material. On contact with the platform or previously jetted build material, the heated liquid droplets cool and solidify.

The piezoelectric jet 39 may also be positioned relatively close to the target position so that the build material may, in a sense, not be considered as traveling ballistically. Accordingly, the terms ejected and jetted are also used herein and describe a relatively small gap or no gap. The illustrated piezoelectric jet 39 is but one embodiment of a dispenser for dispensing build material in metered quantities and to precise target landing positions. It being readily understood by those of skill in the art, that other types of build material dispensers are also contemplated by the invention that can meter build material and accurately deliver it to a target position.

In a preferred embodiment, the apparatus 30 includes positioning means for moving the jetting head 34 in relation to the platform 32. Orthogonal screw drive shafts facilitate the movement of the jetting head 34 in the X- and Y-directions relative to the platform 32. As illustrated, a pair of X-axis drive shafts 44, which are driven by X-axis motor 69 and X-axis drive belt 68, facilitate movement of the jetting head 34 in the X-direction. Y-axis drive shaft 45, which is driven by Y-axis drive motor 71 and Y-axis drive belt 70 facilitates movement of the jetting head 34 in the Y-direction. As will be understood by those having skill in the art, movement of the jetting head 34 in the X-Y plane may also be provided by an r/θ positioner including an arm adapted for radial movement at an angle θ, and a positioner for positioning the jet at a radius, r, along the arm.

In the illustrated embodiment, relative movement in the Z-direction is provided by a Z-axis positioner 43 which moves the platform 32 up and down in the Z-direction. The Z-axis positioner includes vertical drive shafts 60 which engage the platform 32. The drive shafts 60 are driven by the vertical drive motor 61 and vertical drive belts 66 and 67.

Figure 5:
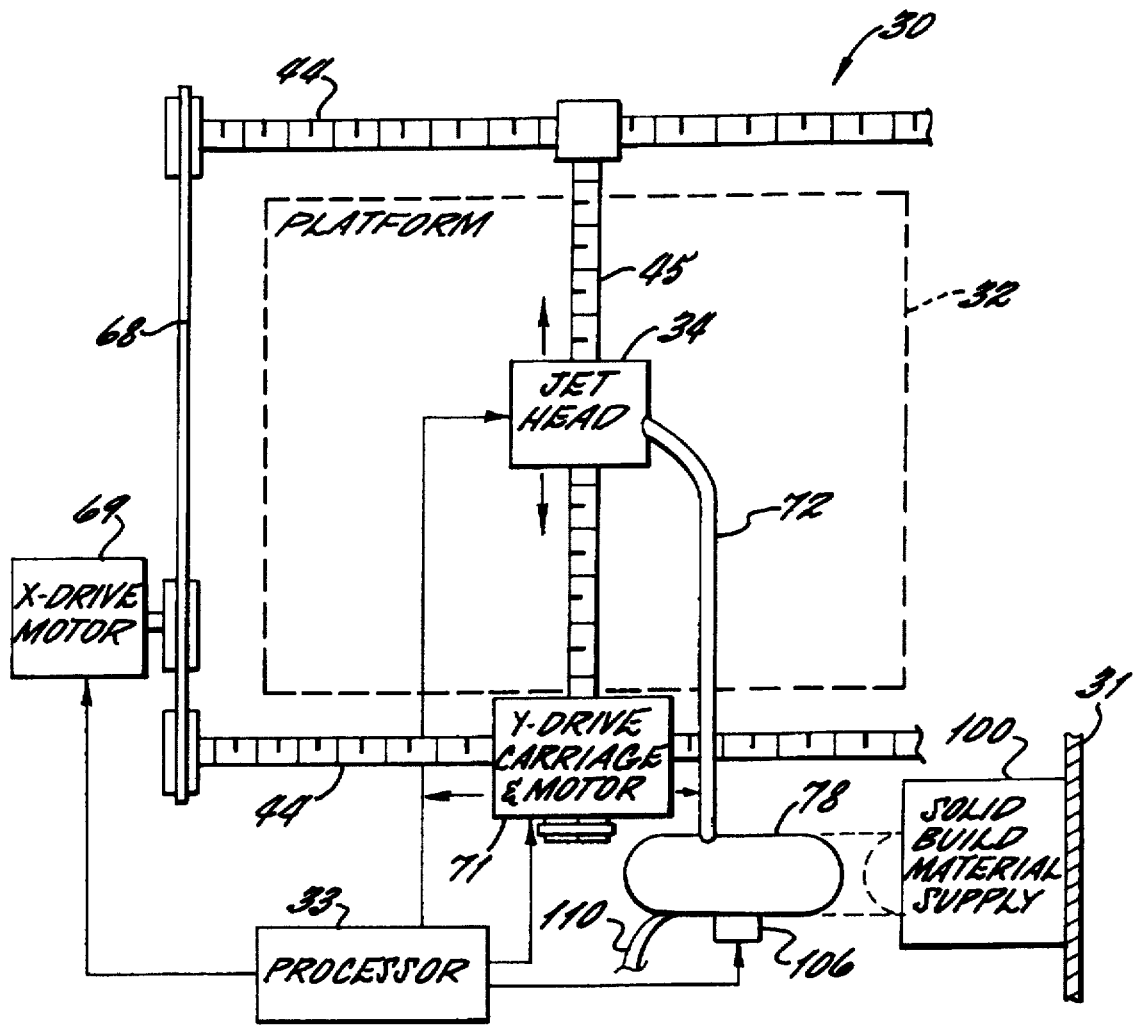
FIG. 5 is a schematic top plan view of a portion of the apparatus according to the invention illustrating positioning of the build material jetting head and delivery of build material thereto.

Referring now more particularly to FIG. 5, the movable build reservoir 78 of the present invention is described in greater detail. The apparatus 10 includes a liquid build material reservoir 78 for supplying liquid build material to the jetting head 34 via a flexible heated tube 72. The build material reservoir 78 may include an electrical resistance heater 79 (FIG. 2) associated therewith for maintaining the build material in the liquid state as would be readily appreciated by those skilled in the art.

The build material reservoir 78 is mounted on the first or Y-direction positioner which includes a movable carriage supporting a first drive motor 71 so that the flexible connecting tube 72 need only flex to accommodate positioning of jetting head 34 along the first or Y-direction, but not along the second or X-direction. Accordingly, the possibility of disrupting liquid build material delivery to through the flexible tube 72 and to the jetting head 34 is significantly reduced. In addition, the inertia of the jetting head 34 can be kept desirably low for high speed and accurate movement, since the jetting head need not include its own source or reservoir of liquid build material. Further, movement of the liquid build material reservoir 78 ensures a homogenous mixture, and also helps to release air bubbles in the liquid build material.

As illustrated, the first and second directions are preferably each linear and orthogonal to one another. In addition, a third or Z-direction positioner 43, as described above, is provided for positioning the 32 platform relative to jetting head 34 along a third direction orthogonal to both the first and second directions. The processor 33 preferably cooperates with the first, second, and third positioners for moving the jetting head 34 along a predetermined path of travel to construct the three-dimensional article based upon article defining data.

Another aspect of the apparatus 30 relates to replenishment of the liquid build material reservoir 78. In particular, the apparatus 30 also preferably includes a solid build material supply means 100 mounted on a portion of the apparatus frame 31. The solid build material supply means 100 stores build material in solid form, such as in the illustrated form of spheres 101, although other shapes and sizes are contemplated by the invention as would be readily understood by those skilled in the art. The solid build material supply means 100 may also include a filler tube 102 and cap 103 as shown to permit replenishment of solid build material by an operator.

The apparatus 30 preferably comprises docking means, cooperating with said first and second positioners, for selectively positioning the build material reservoir 78 adjacent the solid build material supply means 100 and for replenishing build material within the build material reservoir from the solid build material supply means. For example, the liquid build material reservoir 78 and the solid build material supply means 100 may include a corresponding covered openings 105, 104 (FIG. 2) which mate and cooperatively function for permitting transfer of solid build material 101 to the build material reservoir 78. Once in the liquid build material reservoir 78, the solid build material is quickly converted to liquid by the heater 79 and any liquid build material within the reservoir.

The apparatus 30 preferably further comprises a build material level sensor 106 (FIG. 5) associated with build material reservoir 78 and cooperating with the docking means for initiating replenishment of the build material reservoir responsive to a low level of build material within the build material reservoir. In other terms, the processor 33 preferably provides the control functions for operating the positioners in response to the sensed low level of liquid build material to replenish the supply of build material within the reservoir 78.

The build material reservoir 78 may also be connected to a pneumatic system via a tube 110 for applying either vacuum or pressure to the liquid build material. The pneumatic system includes a pump 73, an accumulator 74, a pressure regulator 75, a purge valve 76, and a fill valve 77. The pneumatic system is for emptying and filling the piezoelectric jet 39 and heated tube 72 responsive to certain operating conditions as described further in copending U.S. patent application Ser. No. 08/326,015, entitled "Apparatus and Method for Dispensing Build Material to Make a Three-Dimensional Article," assigned to the assignee of the present invention, and the entire disclosure of which is incorporated herein by reference.

A relatively constant level of liquid build material may be maintained in the build material reservoir 78, so that the surface level of the liquid build material in the build material reservoir 78 is maintained at a relatively constant elevation with respect to the piezoelectric build material jet 39. In preferred embodiments, the jet 39 may be situated above the surface level of the liquid build material, such as about 1 to 3 inches above the surface level of the liquid build material, to thereby maintain a negative meniscus at the orifice of the piezoelectric jet 39. Alternatively, a vacuum could be applied to the liquid build material, such as by coupling a vacuum source to the reservoir 78. The negative meniscus increases the accuracy and uniformity of successive jetted droplets and also reduces undesirable accumulation of build material adjacent the orifice 40 of the jet 39.

Figure 6:
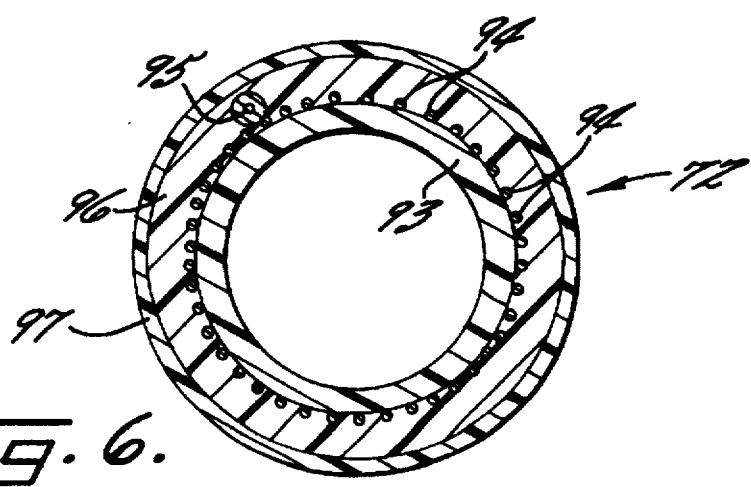
FIG. 6 is a greatly enlarged cross-sectional view of the heated tube connecting the build material reservoir to the build material jetting head.

As illustrated in FIG. 6, the flexible tube 72 may include a flexible interior layer 93, formed of a durable material such as VITON. The interior layer may be surrounded by a thermally conductive layer, such as the illustrated wire mesh braid 94. The wire may be copper which is a good thermal conductor. An insulated electrically resistive wire heating element 95 may be spirally wrapped around the wire mesh braid 94. The heating element may be Nichrome wire surrounded by an electrical insulator. The tube 72 is thus uniformly heated by passing an electrical current through the heating element 95 with the braided wire layer serving to distribute heat. An intermediate layer 96 of thermally insulating material, such as fiberglass, surrounds the heating element 95 and the wire mesh braid 94. The structure is surrounded by an outer protective layer 97, such as provided by heat shrink tubing.

Figure 7:
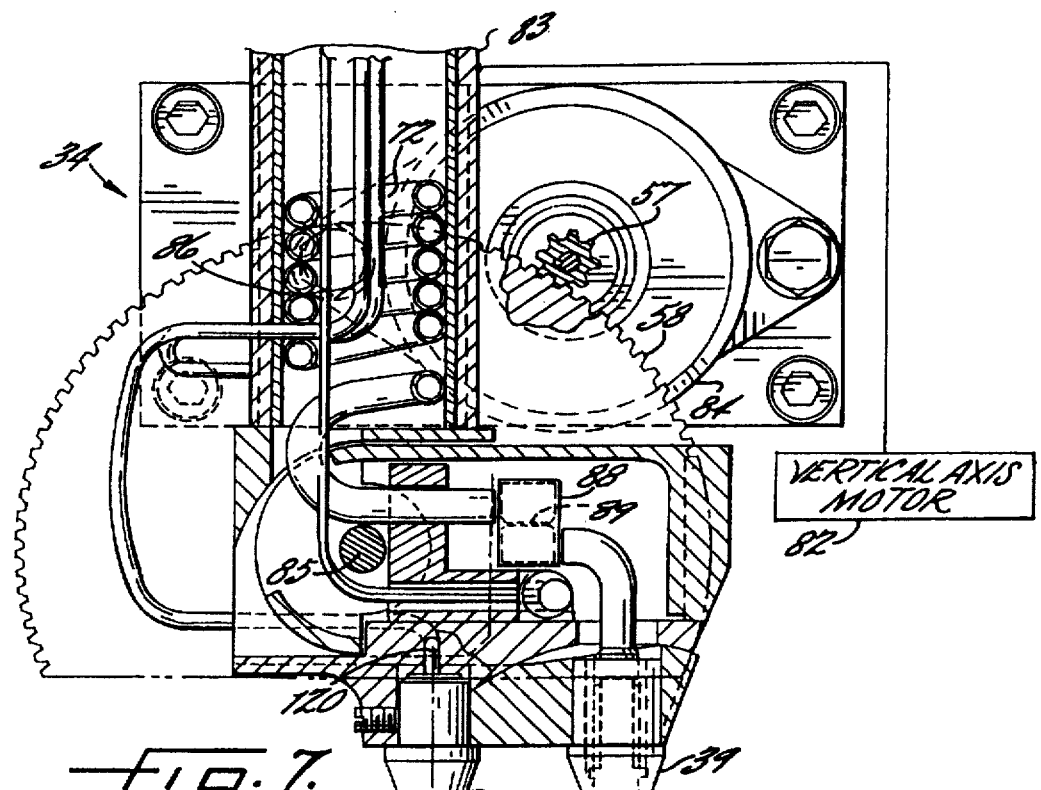
FIG. 7 is a greatly enlarged side view, partially in section, of a portion of the apparatus according to the invention illustrating the build material jetting head positioned to have a vertical firing direction.
Figure 8:
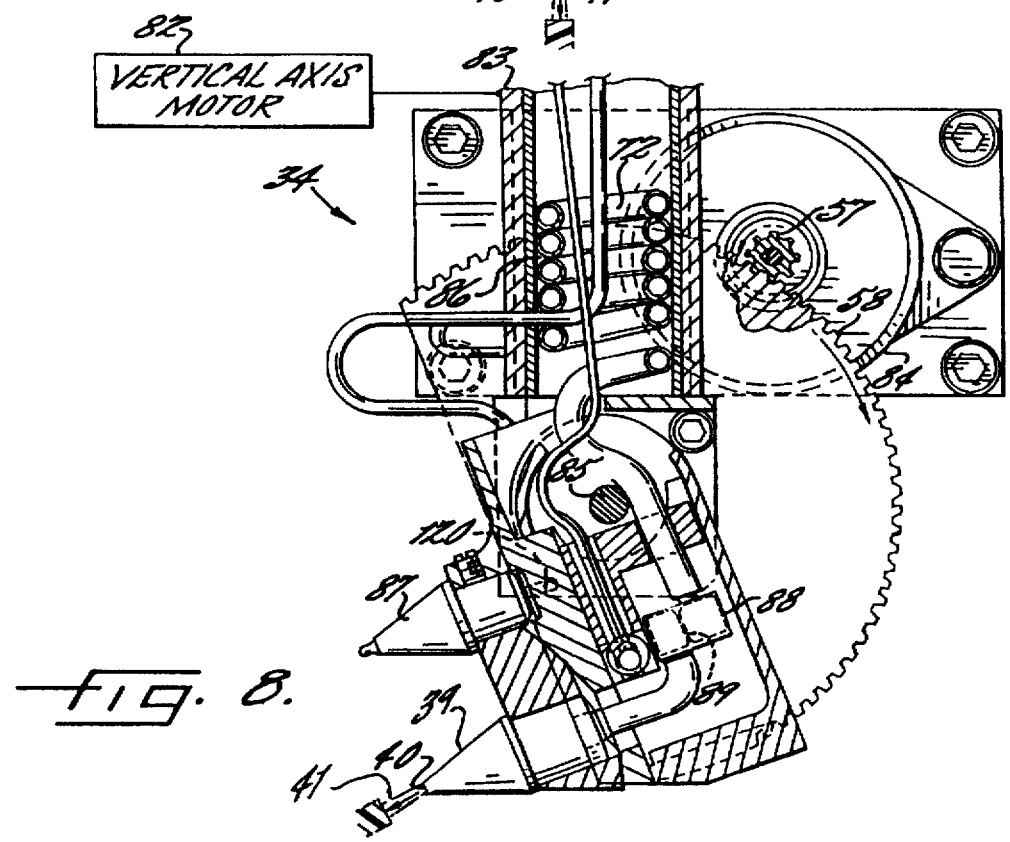
FIG. 8 is a greatly enlarged side view, partially in section, of a portion of the apparatus according to the invention illustrating the build material jetting head positioned to have a near horizontal firing direction based upon rotation about a horizontal axis or flip angle positioning.
Figure 9:
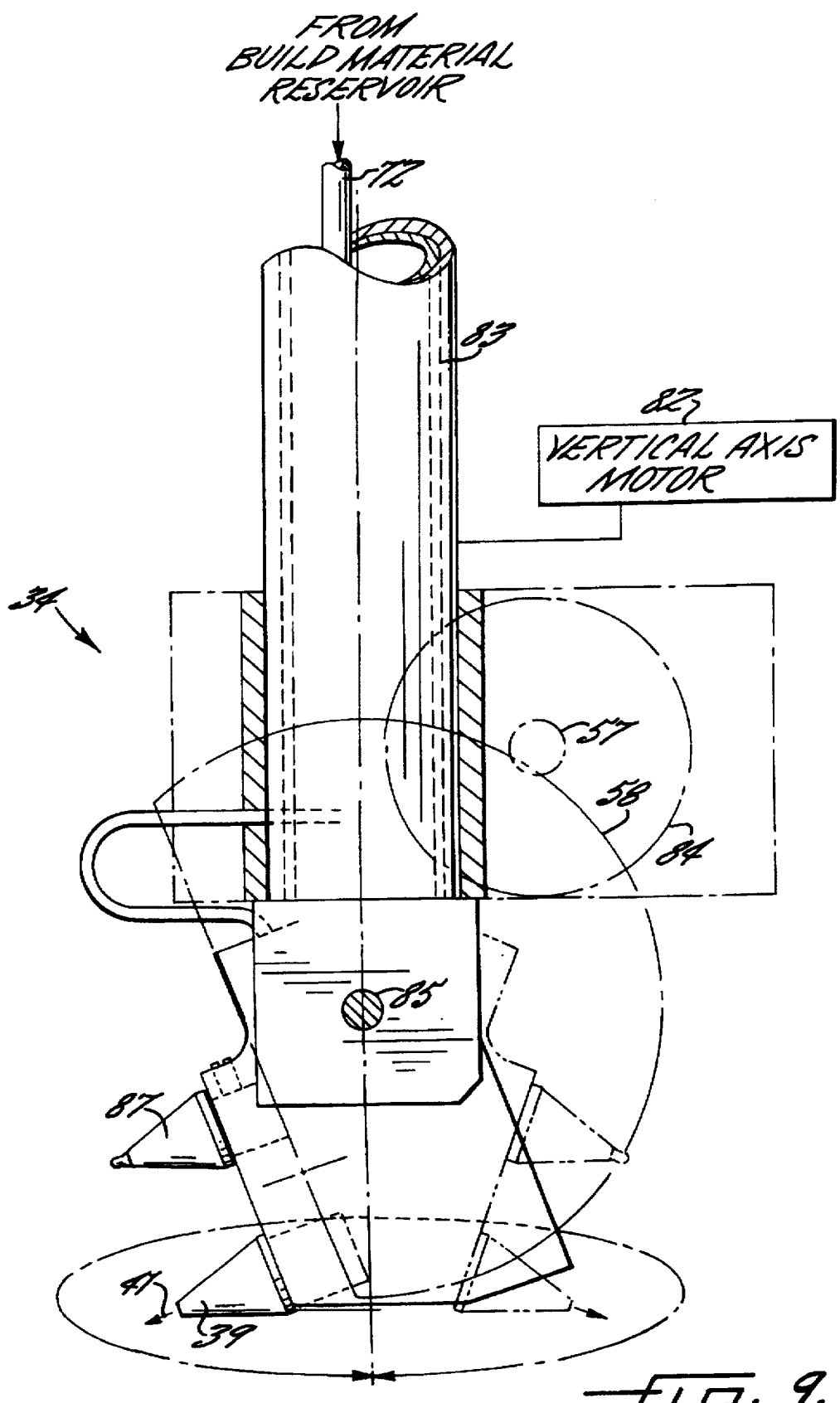
FIG. 9 is a schematic side view of the build material jetting head as shown in FIGS. 7 and 8 illustrating rotation about a vertical axis, that is, phi angle positioning.

As illustrated perhaps best in FIGS. 7 and 8, the jetting head 34 includes means for rotating the piezoelectric jet 39 and a heated body 87 for normalizing surface portions about a horizontal axis or to a desired flip angle. The axis is defined by a horizontal shaft 85 which is driven by an associated motor 84 through drive gears 57 and 58. Accordingly, the firing direction 41 may be adjusted from vertical, as shown in FIG. 7, to near horizontal as shown in FIG. 8. FIGS. 7 and 8 also further illustrate the positioning means which rotates the jetting head 34 about a vertical axis on shaft 83 for rotation to a desired phi angle of rotation. This rotation is powered by vertical axis rotation motor 82 shown in schematic form in FIG. 9.

The heated body 87 is used to periodically normalize surface portions of a partially completed wall. The heated body is further described in U.S. Pat. No. 5,572,431, entitled "Apparatus and Method for Thermal Normalization in Three-Dimensional Article Manufacturing."0 assigned to the assignee of the present invention, and the entire disclosure of which is incorporated herein by reference.

The jetting head 34 preferably carries both the piezoelectric jet 39 and the heated body 87. Both of these elements are heated to a temperature above the melting point of the build material. This heat may be generated by an electrical heating element. In a preferred embodiment, an electrical heater, such as a resistive wire 120, is operatively connected to the heated body 87. Accordingly, the jet 39 receives heated liquid build material from the delivery tube 72 and maintains the build material in a liquid state prior to jetting.

Liquid build material is supplied to the jet 39 through the flexible tube 72. The tube 72 is formed into a spiral coil 86 within the vertical shaft 83 to enable rotation of the jetting head 34 without restricting the flow of build material through the tube and without requiring a rotatable joint and associated seal. The build material tube 72 enters the jetting head through the shaft 83. By rotating the shaft 83, the entire jetting head 34, including the jet 39 and the heated body 87, may be rotated 360 degrees about a vertical axis by the vertical axis motor 82.

A build material passage 104 within the piezoelectric jet 39 provides fluid communication between the baffle 88 and the orifice 40. As discussed above, a heating element, such as an electrical resistance wire, may be used to maintain the build material in a liquid state as it passes from the conduit 72 to the baffle 88, tubular connection 106, and jet 39.

The orifice 40 of the jet 39 is maintained at a predetermined elevation above the surface level of liquid build material in the build material reservoir 78 in the illustrated embodiment. Accordingly, a predetermined negative pressure is exerted upon the liquid build material at the orifice 40. The orifice 40 has a predetermined diameter such that the liquid build material maintains a negative meniscus at the orifice under the influence of the negative pressure. Accordingly, the negative meniscus increases the accuracy and uniformity of successive ballistically jetted droplets and also reduces undesirable accumulation of build material adjacent the orifice 40 of the jet 39.

The piezoelectric jet 39 may include a hollow body including a plastic insert defining a build material flow passage, and a containing a piezoelectric element, in turn, secured within the body by an epoxy. Upon application of an electric signal to the piezoelectric element, the piezoelectric element either contracts or expands depending on the polarity of the signal. In response, an acoustic wave is generated in the liquid build material located in the build material flow passage. This acoustic wave is transmitted through the liquid build material to the negative meniscus at the orifice 40. As a result of the acoustic wave, a droplet of heated liquid build material having a predetermined volume is jetted or ejected from the orifice 40 in firing direction 41 and at a predetermined velocity. The volume and velocity of the droplet are functions of the diameter of the orifice; the size of the piezoelectric element; the intensity and polarity of the electrical signal; and the temperature, surface tension and viscosity of the liquid build material as would be readily understood by those skilled in the art.

In preferred embodiments, it has been found that stable operation of the piezoelectric jet 39 can be sustained at frequencies of up to 12 KHz. Accordingly, the piezoelectric jet 39 is capable of firing 12,000 droplets per second wherein each droplet has a predetermined volume, velocity and firing direction. Other jetting means are also contemplated by the invention as would be readily understood by those skilled in the art. The jet 39 may also be operated to jet droplets in relatively quick succession, that is, in bursts of multiple droplets, so that the droplets in each burst collectively coalesce or solidify at an intended landing position as described in U.S. Pat. No. 5,555,176, entitled "Apparatus and Method for Making Three-Dimensional Articles Using Bursts of Droplets," assigned to the assignee of the present invention, and the entire disclosure of which is incorporated herein by reference.

The build material typically melts at a temperature of from about 50° C. to 250° C., cools quickly and adheres to itself, and has a low rate of shrinkage. Such a build material preferably comprises a solution of a resin having a hydroxyl number of from about 5 to 1000, and a molecular weight greater than about 500, dissolved in at least one primary aromatic sulfonamide preferably having a melting point greater than about 25° C. The theology of the build material is preferably such that a droplet remelts portions of deposited material so as to form a flowable bead. Suitable build materials are further described in commonly assigned copending U.S. patent application Ser. No. 08/325,694, entitled "Build Material for Forming a Three-Dimensional Article," assigned to the assignee of the present invention, and the entire disclosure of which is incorporated herein by reference. In addition, other techniques for jetting or ejecting build material are further described in copending U.S. patent application Ser. No. 08/326,004, entitled "Apparatus and Method for Making Three-Dimensional Article," assigned to the assignee of the present invention, and the entire disclosure of which is incorporated herein by reference.

Referring now additionally to FIGS. 10–15 other significant features of the present invention are described. The build material jet 39 and its associated positioning and processing means as described extensively above may be used to form many types of three-dimensional articles with high precision. Some types of articles, however, may desirably include solid portions which may be readily formed by filling a cavity within a skin formed by the build material jet 39. One example of such an article is the triangular tube 130 having the triangular shape and relatively thick walls 132 defining a central passageway 132 as shown in FIGS. 12 and 13. As will be readily appreciated by those skilled in the art, many other arbitrary articles may be formed in accordance with the present invention.

One approach to making the triangular tube 130 is to first construct a mold and then use the mold to produce one or any desired number of triangular tubes 130. This embodiment of the apparatus 150 (FIG. 14) preferably includes a base 152, processor means for defining a mold skin for producing a mold for the three-dimensional article, and build material dispensing means for dispensing build material responsive to the processor means to construct the mold skin 160 extending outwardly from the base and defining at least one cavity. In the illustrated embodiment, the mold skin defines three adjacent outer cavities 161a, 161b, 162c. In addition, two interior cavities 162 and 163 are also defined as shown by the interior wall portions which extend outwardly from the base 152.

As shown in FIG. 11, the central cavity 163, defined by wall portions 165a, 165b, 165c may be filled by the illustrated filling means or injector 168 by first inverting the mold skin 160 and base 152. The injector 168 includes a first tube 171 through which solidifiable or other fill material 170 may be ejected through the action of the plunger 172. The fill material may be a thermosetting or thermoplastic material; or a curable material, such as an epoxy; or a photocurable or other chemically curable material as would be readily understood by those skilled in the art. The illustrated injector 168 also includes a second tube 173 for penetrating through an adjacent opening to thereby release air from within the cavity 163 during filling.

In other words, the filling means introduces solidifiable fill material 170 into one or more cavities to form solid mold portions. In the illustrated embodiment, the three outer cavities 161a, 161b, 161c will also be filled similar to the central cavity 163. As would be readily understood by those skilled in the art, other features for the mold parts may also be readily formed, such as to provide mold parting lines, cooling channels, runners, etc.

The base 152 preferably includes penetrable surface defining means for being penetrated to introduce the solidifiable fill material 170 into the cavity 163. The penetrable surface defining means preferably comprises a layer 153 of material having properties, such as its surface finish, for example, for adhering dispensed build material thereto. The base 152 illustratively includes a generally planar member 154 having a plurality of openings 155 extending therethrough.

The penetrable surface defining means is preferably provided by a relatively thin plastic layer 154 removably secured to the planar member 154, such as by a contact adhesive as would be readily understood by those skilled in the art. As would be readily understood by those skilled in the art, the thin plastic layer may be integrally formed with the planar member if desired. The plastic layer 154 provides a smooth and continuous surface for dispensing build material thereon, and promotes adhesion of the dispensed build material. Since the plastic layer 153 is relatively thin, it is readily punctured or penetrated by the first and second tubes 171, 173 of the injector 165. In addition, base 152, including its planar member 154 and plastic layer 153, may be transparent to facilitate viewing of the level during manual filling, for example.

The planar member 154 provides rigidity to ensure accuracy during construction of the mold skin 160, and during handling of the base 152 and mold skin once fully formed. The plurality of openings 155 of the planar member 154 are desirably arranged in a predetermined pattern so that first and second openings are aligned with a cavity to facilitate penetration of the plastic layer 153 and introduction of solidifiable fill material into the cavity and allow air to escape from the cavity during filling. The openings 155 thereby serve as a guide for positioning the tube of the filling means in fluid communication with a cavity.

As will be readily apparent to those skilled in the art, the above described skin construction and cavity filling may be readily used for many articles including a solid portion. The speed of construction of the article is greatly enhanced, yet the final article surface finish and overall accuracy may be very high. In addition, if desired, the skin may be readily removed, such as by dissolving in a chemical bath or heating, for example, to thereby free the solid article having the desired shape.

Figure 14:
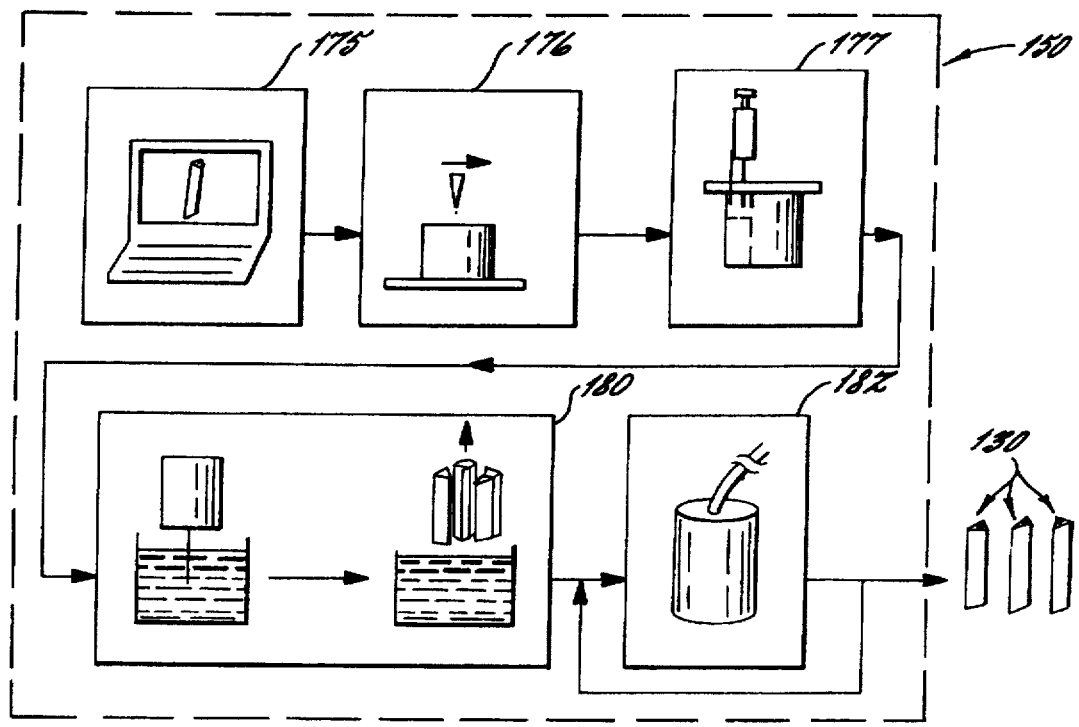
FIG. 14 is a schematic block diagram of an embodiment of the invention for producing molded articles.
Figure 15:
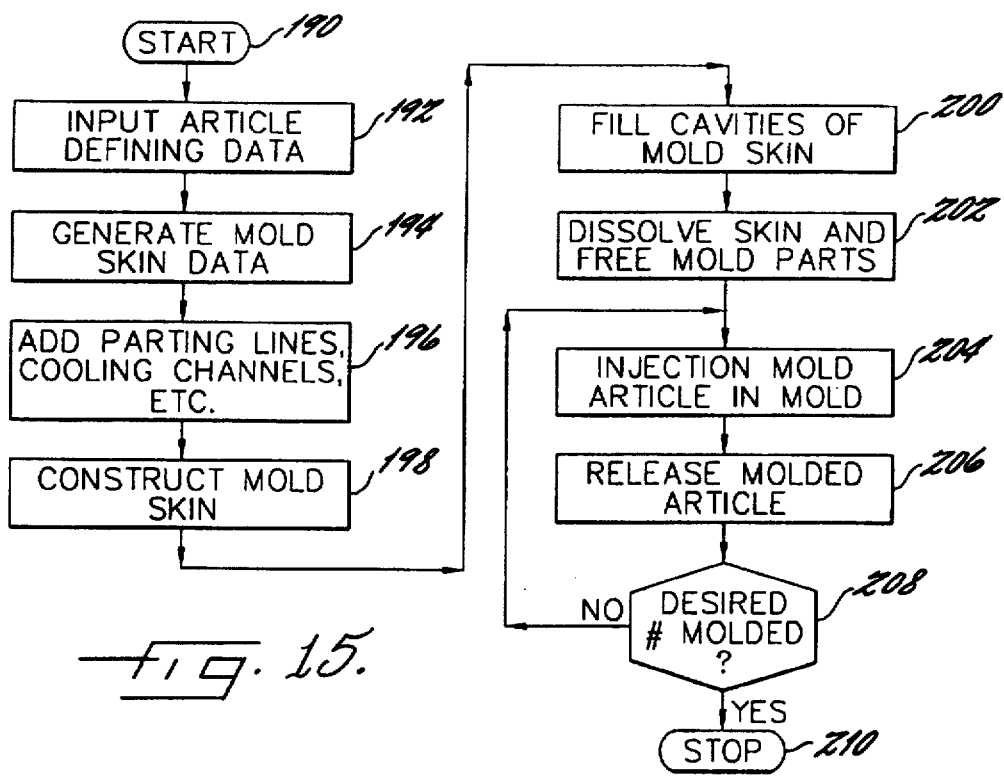
FIG. 15 is a flowchart illustrating the steps of forming molded articles using the apparatus as shown in FIG. 14.

The overall operation of the apparatus 150 is further understood by more particular reference to FIGS. 14 and 15 wherein the various component parts, stations or modules, and their interrelationships are further described. From the start (Block 192), article defining data may be input via an external computer or the illustrated control computer station 175. A processor operating under stored program control, such as the computer station 175, may then generate mold skin data at Block 194, and include any mold parting lines, cooling channels, runners, and other desired mold features into the data defining the mold skin (Block 196) as would be readily understood by those skilled in the art. Portions of the mold facilitating assembly and disassembly of the mold portions or parts may also be readily implemented according to the invention as would also be readily understood by those skilled in the art.

The mold skin 130 may then be constructed at Block 198 using the build material dispensing means and positioning means schematically illustrated by the build station 176. From the mold skin build station 176, the mold skin may then be inverted and filled with a solidifiable material (Block 200) as schematically illustrated using the filling station or module 177. In some embodiments of the invention, the filling of cavities may be accomplished at least in part at predetermined times during construction of the wall portions defining the cavities as would be readily understood by those skilled in the art.

The mold skin 130 may then be dissolved and the mold parts freed at Block 202. The illustrated chemical dissolving station 180 is but one contemplated approach to removing or separating the mold parts from the mold skin. Other variations, such as heating to melt the skin away, for example, are also envisioned by and included within the present invention as would be readily understood by those skilled in the art.

At Block 204, the mold parts are used at the illustrated molding station 182, such as an injection molder, to produce a molded article 130 which is then released from the mold at Block 206. The molding station may also incorporate a caster or other molding devices as would be readily understood by those skilled in the art. The molded articles may be formed of plastic, metal or other materials, as would be readily understood by those skilled in the art. A substantial benefit of making the mold as described herein, is that the mold can be reused to produce any desired number of articles with considerable speed and accuracy, and with the ability to produce solid articles, or articles of many different materials. Accordingly, at Block 208, if the desired number of articles 130 have not yet been made, the molding operation may be repeated until the desired number of articles has been made and the apparatus stopped (Block 210).

The build material and/or solidifiable fill or mold material may also be recycled or reused according to another aspect of the invention. In other words, the apparatus may require only replenishment of the material forming the articles themselves, while the build material and/or solidifiable material is melted, for example, and reused.

Another aspect of the invention is that the base 152 and its penetrable surface defining means or layer 153 may advantageously be used to form solid articles or form articles having solid portions, for example. In other words, the solid portions may be produced by separating the skin from the solid portion. In addition, the skin may be left covering the solid portions to produce a desired three-dimensional article. In a variation of this embodiment of the invention, the filling of the at least one cavity may be accomplished by manual injection or introduction of solidifiable or other fill materials. Accordingly, the base 152 and its penetrable surface defining means may be transparent to facilitate viewing of the fill level during filling.

Many modifications and other embodiments of the invention will come to the mind of one skilled in the art having the benefit of the teachings presented in the foregoing descriptions and the associated drawings. In addition, the following copending, commonly assigned patent applications and commonly assigned U.S. patents include further information relating to three-dimensional article making that may be of interest, and all of which are incorporated herein in their entirety by reference: U.S. Pat. No. 5,572,431, entitled "Apparatus and Method for Thermal Normalization in Three-Dimensional Article Manufacturing;" U.S. Pat. No. 5,555,176, entitled "Apparatus and Method for Making Three-Dimensional Articles Using Bursts of Droplets;" and U.S. patent application Ser. No. 08/325,694, entitled "Build Material for Forming a Three-Dimensional Article." Therefore, it is to be understood that the invention is not to be limited to the specific embodiments disclosed, and that modifications and embodiments are intended to be included within the scope of the appended claims.

That which is claimed is:

1. An apparatus for making a three-dimensional article based upon article defining data, said apparatus comprising:

a base;

processor means for defining a mold skin for producing a mold for the three-dimensional article based upon the article defining data;

build material dispensing means for dispensing build material responsive to said processor means to construct the mold skin extending outwardly from said base and defining at least one cavity;

said base comprising penetrable surface defining means for being penetrated to introduce a solidifiable fill material into the at least one cavity;

filling means for penetrating said penetrable surface defining means of said base and introducing solidifiable fill material into the at least one cavity to form solid mold portions;

separating means for separating the solid mold portions from the mold skin; and molding means for using the solid mold portions to form the three-dimensional article.

2. An apparatus according to claim 1 wherein said penetrable surface defining means comprises a layer of material having properties for adhering dispensed build material thereto.

3. An apparatus according to claim 1 wherein said base comprises a generally planar member having a plurality of openings extending therethrough.

4. An apparatus according to claim 3 wherein said plurality of openings are arranged in a predetermined pattern so that first and second openings are aligned with the at least one cavity to facilitate introduction of solidifiable fill material through the first opening and into the at least one cavity and to facilitate escape of air from the at least one cavity and through the second opening during filling.

5. An apparatus according to claim 3 wherein said penetrable surface defining means comprises a relatively thin plastic layer on said planar member.

6. An apparatus according to claim 5 wherein said base further comprises a pressure sensitive adhesive for removably mounting said plastic layer on said planar member.

7. An apparatus according to claim 1 wherein said filling means further comprises volume determining means for determining a volume of solidifiable fill material to be introduced into the at least one cavity.

8. An apparatus according to claim 1 wherein said filling means comprises means for penetrating a second area of said penetrable surface defining means for permitting escape of air from the at least one cavity during filling thereof.

9. An apparatus according to claim 1 wherein said separating means comprises build material dissolving means for dissolving build material defining the mold skin.

10. An apparatus according to claim 1 wherein said molding means comprises an injection molder.

11. An apparatus according to claim 1 wherein said build material dispensing means comprises:

a build material jet; and jet positioning means for advancing said build material jet along a predetermined path of travel relative to said base.

12. An apparatus according to claim 11 wherein said jet positioning means comprises means for positioning said build material jet in three directions and relatively rotatably positioning said build material jet about two axes thereby defining five degrees of freedom of movement for said build material jet relative to said base.

13. An apparatus according to claim 12 wherein said jet positioning means for relatively positioning said build material jet with respect to said base comprises:

Z-direction positioning means for positioning said build material jet and said base vertically relative to one another;

X-Y positioning means for positioning said build material jet and said base in an X-Y planar direction relative to one another;

flip angle positioning means for rotatably positioning said build material jet relative to an axis generally parallel to said base; and phi angle positioning means for rotatably positioning said build material jet relative to an axis generally perpendicular to said base.

14. An apparatus for making a three-dimensional article based upon article defining data, said apparatus comprising:

a base;

build material dispensing means for dispensing build material based upon the article defining data to construct wall portions extending outwardly from said base and defining at least one cavity;

said base comprising penetrable surface defining means for being penetrated to introduce fill material into the at least one cavity; and filling means for introducing solidifiable fill material into the at least one cavity so that solidified fill material defines at least a portion of the three-dimensional article or defines at least one mold portion for facilitating molding of the three-dimensional article.

15. An apparatus according to claim 14 wherein said penetrable surface defining means comprises a layer of material having properties for adhering dispensed build material thereto.

16. An apparatus according to claim 14 wherein said base comprises a generally planar member having a plurality of openings extending therethrough.

17. An apparatus according to claim 16 wherein said plurality of openings are arranged in a predetermined pattern so that first and second openings are aligned with the at least one cavity to facilitate introduction of solidifiable fill material through the first opening and into the at least one cavity and to facilitate escape of air from the at least one cavity and through the second opening during filling.

18. An apparatus according to claim 16 wherein said penetrable surface defining means comprises a relatively thin plastic layer on said planar member.

19. An apparatus according to claim 18 wherein said base further comprises a pressure sensitive adhesive for removably mounting said plastic layer on said planar member.

20. An apparatus according to claim 14 wherein said base comprises transparent material to permit viewing during filling of the at least one cavity.

21. An apparatus according to claim 14 wherein said filling means comprises means for penetrating a first area of said penetrable surface defining means.

22. An apparatus according to claim 21 wherein said filling means further comprises volume determining means for determining a volume of solidifiable fill material to be introduced into the at least one cavity.

23. An apparatus according to claim 21 wherein said filling means comprises means for penetrating a second area of said penetrable surface defining means for permitting escape of air from the at least one cavity during filling thereof.

24. An apparatus according to claim 21 further comprising separating means for separating a solid portion formed within the at least one cavity from dispensed build material.

25. An apparatus according to claim 24 wherein said separating means comprises build material dissolving means for dissolving build material.

26. An apparatus for making a three-dimensional article based upon article defining data, said apparatus comprising:

a base;

build material dispensing means for dispensing build material based upon the article defining data to construct a mold skin extending outwardly from said base and defining at least one cavity;

filling means for introducing solidifiable fill material into the at least one cavity to form solid mold portions; and molding means for using the solid mold portions to form the three-dimensional article.

27. An apparatus according to claim 26 wherein said base comprises:

a generally planar member having a plurality of openings extending therethrough; and a relatively thin layer on said planar member for being penetrated by said filling means to introduce solidifiable fill material into the at least one cavity.

28. An apparatus according to claim 27 wherein said plurality of openings are arranged in a predetermined pattern so that first and second openings are aligned with the at least one cavity to facilitate introduction of solidifiable fill material through the first opening and into the at least one cavity and to facilitate escape of air from the at least one cavity and through the second opening during filling.

29. An apparatus according to claim 27 wherein said base further comprises a pressure sensitive adhesive for removably mounting said plastic layer on said planar member.

30. An apparatus according to claim 26 wherein said filling means further comprises volume determining means for determining a volume of solidifiable fill material to be introduced into the at least one cavity.

31. An apparatus according to claim 26 wherein said filling means comprises a first tube for penetrating said base at a first area thereof and introducing fill material therethrough.

32. An apparatus according to claim 26 wherein said filling means comprises a second tube for penetrating a second area of said base for permitting escape of air from the at least one cavity during filling thereof.

33. An apparatus according to claim 26 further comprising separating means for separating the solid mold portions from the mold skin.

34. An apparatus according to claim 33 wherein said separating means comprises build material dissolving means for dissolving build material defining the mold skin.

35. An apparatus according to claim 26 wherein said molding means comprises an injection molder.

36. An apparatus according to claim 26 wherein said build material dispensing means comprises:

a build material jet; and jet positioning means for advancing said build material jet along a predetermined path of travel relative to said base.

37. An apparatus according to claim 36 wherein said jet positioning means comprises means for positioning said build material jet in three directions and relatively rotatably positioning said build material jet about two axes thereby defining five degrees of freedom of movement for said build material jet relative to said base.

38. An apparatus for making a mold comprising:

a base;

build material dispensing means for dispensing build material to construct a mold skin extending outwardly from said base and defining at least one cavity;

filling means for introducing solidifiable fill material into the at least one cavity to form solid mold portions; and separating means for separating the solid mold portions from the mold skin.

39. An apparatus according to claim 38 wherein said base comprises:

a generally planar member having a plurality of openings extending therethrough; and a relatively thin layer on said planar member for being penetrated by said filling means to introduce solidifiable fill material into the at least one cavity.

40. An apparatus according to claim 39 wherein said plurality of openings are arranged in a predetermined pattern so that first and second openings are aligned with the at least one cavity to facilitate introduction of solidifiable fill material through the first opening and into the at least one cavity and to facilitate escape of air from the at least one cavity and through the second opening during filling.

41. An apparatus according to claim 39 wherein said base further comprises a pressure sensitive adhesive for removably mounting said relatively thin layer on said planar member.

42. An apparatus according to claim 38 wherein said filling means further comprises volume determining means for determining a volume of solidifiable fill material to be introduced into the at least one cavity.

43. An apparatus according to claim 38 wherein said filling means comprises a first tube for penetrating said base at a first area thereof and introducing fill material therethrough.

44. An apparatus according to claim 38 wherein said filling means comprises a second tube for penetrating a second area of said base for permitting escape of air from the at least one cavity during filling thereof.

45. An apparatus according to claim 38 wherein said separating means comprises build material dissolving means for dissolving build material defining the mold skin.

46. An apparatus according to claim 38 wherein said build material dispensing means comprises:

a build material jet; and jet positioning means for advancing said build material jet along a predetermined path of travel relative to said base.

47. An apparatus according to claim 46 wherein said jet positioning means comprises means for positioning said build material jet in three directions and relatively rotatably positioning said build material jet about two axes thereby defining five degrees of freedom of movement for said build material jet relative to said base.

48. A method for making a three-dimensional article based upon article defining data, the method comprising the steps of:

providing a base having a penetrable surface;

dispensing build material based upon the article defining data to construct wall portions extending outwardly from the base and defining at least one cavity; and penetrating the penetrable surface of the base and introducing fill material therethrough and into the at least one cavity so that the fill material defines at least a portion of the three-dimensional article or defines at least one mold portion for facilitating molding of the three-dimensional article.

49. A method according to claim 48 wherein the step of introducing fill material comprises introducing solidifiable fill material.

50. A method according to claim 48 wherein the dispensing step comprises dispensing build material so as to adhere dispensed build material to the penetrable surface of the base.

51. A method according to claim 48 wherein the step of providing the base comprises providing a generally planar member having a plurality of openings extending therethrough.

52. A method according to claim 51 wherein the step of providing the base further comprises removably connecting a relatively thin plastic layer on the planar member.

53. A method according to claim 48 wherein the step of filling comprises first determining a volume of fill material to be introduced into the at least one cavity.

54. A method according to claim 48 further comprising the step of penetrating a second area of the penetrable surface of the base for permitting escape of air from the at least one cavity during filling thereof.

55. A method according to claim 49 further comprising the step of separating solid portions formed within the at least one cavity from dispensed build material.

56. A method according to claim 55 further comprising the step of molding the three-dimensional article using the solid portions as mold portions.

57. A method according to claim 56 wherein the step of molding comprises injection molding the three-dimensional article.

58. A method according to claim 56 wherein the step of molding comprises repeatedly molding the three-dimensional article to form a plurality of such three-dimensional articles.

59. A method according to claim 48 wherein the step of dispensing build material comprises dispensing build material from a build material jet while positioning the jet in three directions and relatively rotatably positioning the jet about two axes thereby defining five degrees of freedom of movement for the build material jet relative to the base.

60. A method for making a three-dimensional article based upon article defining data, the method comprising the steps of:

providing a base;

dispensing build material based upon article defining data to construct a mold skin extending outwardly from the base and defining at least one cavity;

introducing solidifiable fill material into the at least one cavity to form solid mold portions; and molding the three-dimensional article using the solid mold portions.

61. A method according to claim 60 further comprising the step of separating the solid mold portions from the mold skin.

62. A method according to claim 60 further comprising the step of defining the mold skin for producing a mold for the three-dimensional article.

63. A method according to claim 60 wherein the step of molding comprises injection molding the three-dimensional article.

64. A method according to claim 60 wherein the step of molding comprises repeatedly molding the three-dimensional article to form a plurality of such three-dimensional articles.

65. A method according to claim 60 wherein the dispensing step comprises dispensing build material so as to adhere dispensed build material to the penetrable surface of the base.

66. A method according to claim 60 wherein the step of providing the base comprises providing a generally planar member having a plurality of openings extending therethrough.

67. A method according to claim 66 wherein the step of providing the base further comprises removably connecting a relatively thin plastic layer on the planar member; and wherein the step of introducing fill material comprises penetrating the plastic layer and introducing fill material therethrough.

68. A method according to claim 60 wherein the step of filling comprises first determining a volume of fill material to be introduced into the at least one cavity.

69. A method according to claim 60 further comprising the step of penetrating a second area of the penetrable surface of the base for permitting escape of air from the at least one cavity during filling thereof.

70. A method according to claim 60 wherein the step of dispensing build material comprises dispensing build material from a build material jet while positioning the jet in three directions and relatively rotatably positioning the jet about two axes thereby defining five degrees of freedom of movement for the build material jet relative to the base.

* * * * *